United States Patent [19]

Shibata

[11] Patent Number: 4,562,498

[45] Date of Patent: Dec. 31, 1985

[54] LOADING/EJECTING DEVICE FOR A MAGNETIC DISK

[75] Inventor: Haruo Shibata, Tokyo, Japan

[73] Assignee: Tokyo Shibaura Denki Kabushiki Kaisha, Kawasaki, Japan

[21] Appl. No.: 556,783

[22] Filed: Dec. 1, 1983

[30] Foreign Application Priority Data

Jan. 31, 1983 [JP] Japan .................. 58-13984

[51] Int. Cl.⁴ ............................................ G11B 17/04
[52] U.S. Cl. ........................................ 360/97; 360/99
[58] Field of Search ..................... 360/97–99,
360/86, 133, 96.5; 242/198; 369/262, 261, 270

[56] References Cited

U.S. PATENT DOCUMENTS

| | | | |
|---|---|---|---|
| 3,899,794 | 8/1975 | Brown | 360/133 |
| 3,972,072 | 7/1976 | Richt | 360/93 |
| 4,065,800 | 12/1977 | Wilson et al. | 360/137 |
| 4,227,224 | 10/1980 | Umezawa et al. | 360/96.5 |
| 4,272,794 | 6/1981 | Skarky | 360/97 |
| 4,310,864 | 1/1982 | Patel et al. | 360/97 |
| 4,368,495 | 1/1983 | Hamanaka et al. | 360/97 |
| 4,447,838 | 5/1984 | Kato | 360/96.5 |
| 4,479,210 | 1/1984 | Nakayama | 369/194 |

FOREIGN PATENT DOCUMENTS

| | | | |
|---|---|---|---|
| 892045 | 1/1982 | Belgium | 360/96.5 |
| 892951 | 8/1982 | Belgium | 360/86 |
| 0082505 | 6/1983 | European Pat. Off. | 360/133 |
| 576462 | 1/1982 | Japan | 360/97 |

OTHER PUBLICATIONS

Tandon Corporation, "TM35-2/TM35-4 Specifications," 1982.

Primary Examiner—Stuart N. Hecker
Assistant Examiner—Benjamin Urcia
Attorney, Agent, or Firm—Cushman, Darby & Cushman

[57] ABSTRACT

A loading/ejecting device for loading and ejecting a floppy disk into and from a magnetic disk reproducing apparatus has a holder for containing the disk therein. The holder is supported by a pair of guide plates to be vertically movable directly between a first position where the disk can be inserted into or ejected from the holder and a second position where the disk can be reproduced or recorded. A loading/ejecting member is supported by the guide plates to be movable between an initial position and an advanced position. The member is urged by tension springs toward the advanced position and is locked by a locking member in the initial position. When the disk is inserted into the holder, a push member supported on the holder is moved by the disk to push the locking member, thereby disengaging the locking member from the loading/ejecting member. As a result, the loading/ejecting member is moved from the initial position to the advanced position, thereby moving the holder from the first position to the second position.

13 Claims, 8 Drawing Figures

LOADING/EJECTING DEVICE FOR A MAGNETIC DISK

BACKGROUND OF THE INVENTION

The present invention relates to a magnetic disk loading/ejecting device used in a magnetic disk drive apparatus.

Generally, a magnetic disk drive apparatus, e.g., a floppy disk drive apparatus, which is used as an external memory device of a computer, is provided with a disk loading/ejecting device. The disk loading/ejecting device has holding means for placing a floppy disk in a drive position. The holding means has a clamper, is rotatably mounted on the base plate of the disk drive apparatus, and operates in interlock with a door of a floppy disk insertion slot. It stays in a first position as long as this door is closed. While the holding means remains at the first position, the clamper and a spindle planted on the base plate clamp a floppy disk. When the door is opened, the holding means is rotated to a second position, thus moving the clamper away from the spindle. After a floppy disk is inserted through the slot and put on the spindle, the door is closed. The moment the door is closed, the holding means is rotated to the first position, whereby the spindle and clamper clamp the floppy disk at the drive position. Since the holding means rocks between the first and second position, it inevitably occupies much space. Therefore, the magnetic disk drive apparatus is bulky and the accuracy with which the disk is positioned in the drive position is rather low.

SUMMARY OF THE INVENTION

The present invention is contrived in consideration of these circumstances, and is intended to provide a magnetic disk loading/ejecting device capable of positioning a magnetic disk with a high degree of accuracy and permitting reduction of the overall size of the magnetic disk drive apparatus.

According to one aspect of the invention, there is provided a loading/ejecting device which comprises guide means attached to the chassis of a magnetic disk reproducing apparatus; a holder located above driving means of the magnetic disk reproducing apparatus and containing a magnetic disk, said holder being supported by the guide means in such a way that it can move vertically directly between a first position where the magnetic disk can be inserted or ejected, and a second position where the magnetic disk can be driven by the driving means; a loading/ejecting member supported by the guide means to be movable between an initial position and an advanced position, said member being adapted to move the holder from the first position to the second position as said member moves from the initial position in the advanced position, and to move the holder from the second position to the first position as said member moves from the advanced position to the initial position; locking means adapted to engage the loading/ejecting member, thereby locking the loading/ejecting member in the initial position thereof; a push member supported by the holder in such a way as to be movable between first and second positions, and adapted to move from the first position to the second position thereof, in conjection with insertion of the magnetic disk into the holder, thereby pushing the locking means to disengage the same from the loading/ejecting member; and an operating member capable of pushing the loading/ejecting member toward the initial position.

According to the loading/ejecting device of the invention, the holder containing the magnetic disk is moved straight ahead by the loading/ejecting member. Therefore, the space needed for the movement of the holder is narrower than the space required in the prior art loading/ejecting device, whose holder is adapted to be rocked. Thus, the overall size of the magnetic disk reproducing apparatus can be reduced. Moreover, the magnetic disk, along with the holder, is moved directly to the second position or the loading position. Thus, according to the loading/ejecting device of the invention, the magnetic disk can be moved with a high degree of accuracy to a predetermined position which corresponds to the positions of driving means and magnetic reproducing means of the magnetic disk reproducing apparatus.

BRIEF DESCRIPTION OF THE DRAWINGS

FIGS. 1 to 8 show a loading/ejecting device according to one embodiment of the present invention, in which:

FIG. 1 is a disassembled perspective view of the device;

FIG. 2 is a perspective view of the device;

FIGS. 3 and 4 are a side view and a schematic front view, respectively, of the device in a state in which a holder is located in a first position;

FIGS. 5 and 6 are a side view and a schematic front view, respectively, of the device in a state in which the holder is moving from the first position to the second position; and FIGS. 7 and 8 are a side view and a schematic front view, respectively, of the deivce in a state in which the holder is located in the second position.

DETAILED DESCRIPTION OF THE PREFERRED EMBODIMENT

One embodiment of the present invention will now be described in detail with reference to the accompanying drawings.

Figure 1:
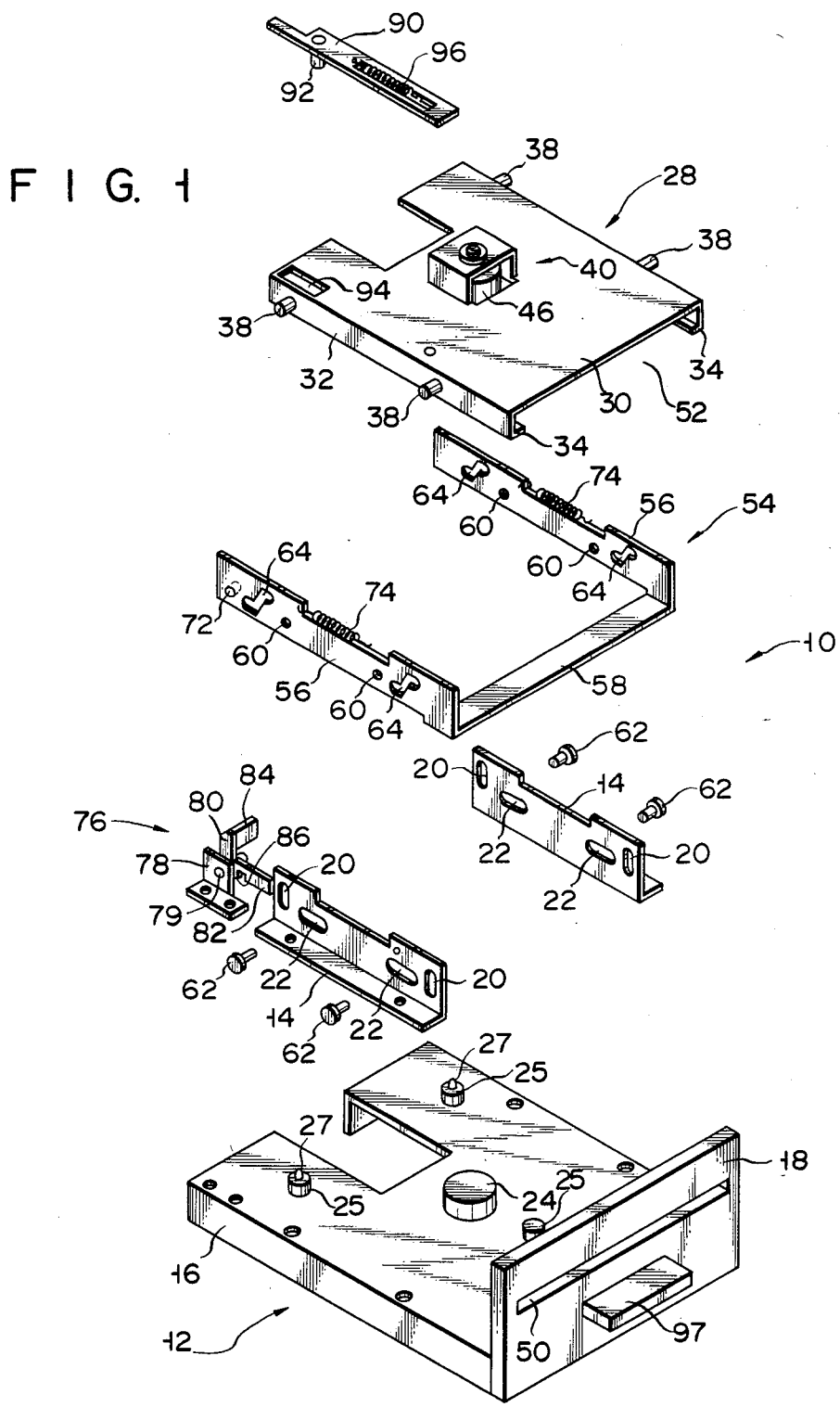
Figure 2:
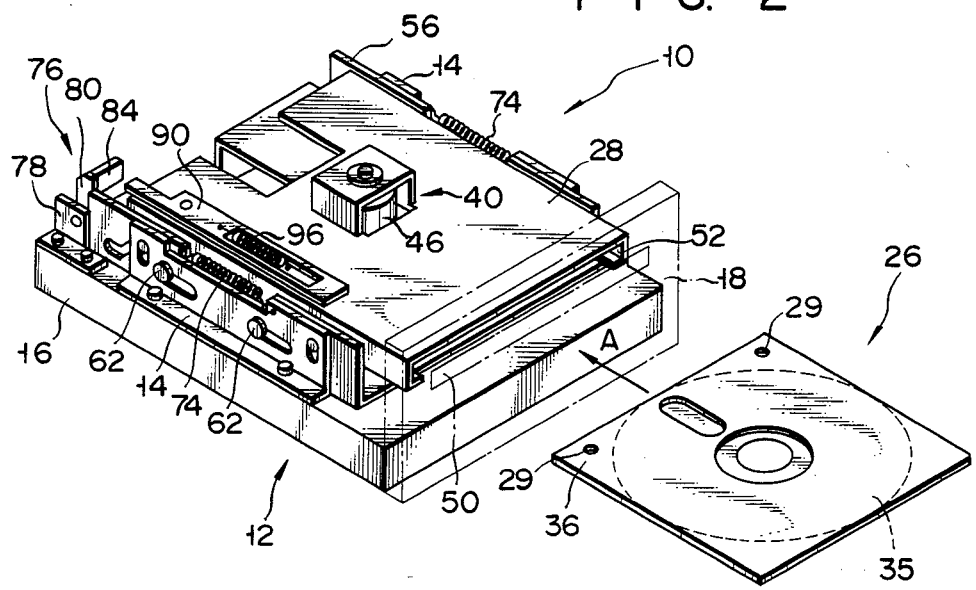
Figure 3:
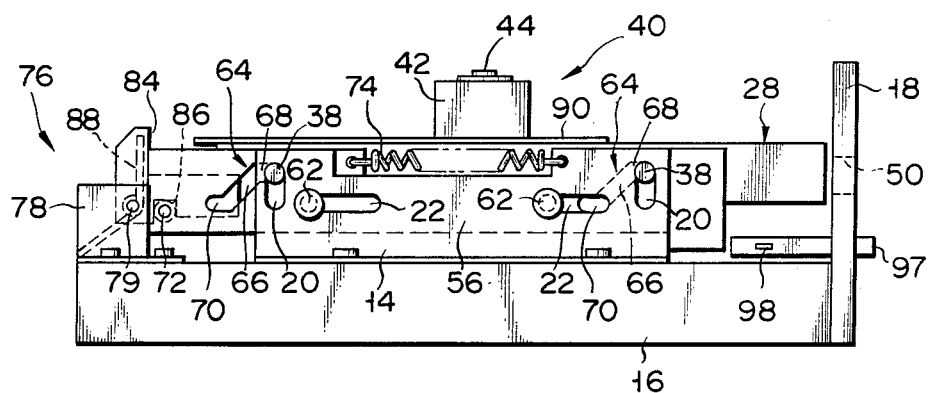

As shown in FIGS. 1 to 3, a loading/ejecting device 10 is provided with a pair of guide plates 14 which are mounted on the chassis 12 of a magnetic disk drive apparatus, such as a floppy disk drive apparatus. The chassis 12 includes a base plate 16 and a front plate 18 erected on one end of the base plate 16. The guide plates 14 are fixed on the base plate 16, being spaced apart and facing each other. Each guide plate 14 has a pair of first guide slots 20 and a pair of second guide slots 22. The first guide slots 20 are formed individually at both end portions of the guide plate 14, extending parallel to each other and at right angles to the base plate 16. The second guide slots 22 are spaced from each other between the first guide slots 20, extending parallel to the base plate 16. Namely, the second guide slots 22 extend at right angles to the first guide slots 20. A spindle 24 for driving a magnetic disk is rotatably mounted on the base plate 16. Projecting upward from the base plate 16, the spindle 24 is located between the guide plates 14. The spindle 24 is rotated by a driving source (not shown). On the base plate 16 are erected three positioning pins 25 for positioning a floppy disk. Two positioning pins 25 have engaging projections 27 at their topmost surfaces.

Also, the loading/ejecting device 10 is provided with a holder 28 which contains a floppy disk 26 and is movably disposed between the guide plates 14. The holder 28, which is formed by bending a substantially rectangular plate, has a top wall 30, a pair of side walls 32 facing each other, and flanges 34 formed by bending the lower end portions of the individual side walls 32. The floppy disk 26 includes a magnetic recording medium which is formed by coating a magnetic material on both sides of a thin base film, for example, a magnetic disk 35, and a square plastic cartridge 36 containing the same. The cartridge 36 has two through holes 29 which are bored in the two corners thereof and the engaging projections 27 are to be inserted into the holes 29.

The distance between the side walls 32 and the longitudinal length of each side wall 32 are substantially equal to the length of each side of the cartridge 36. The holder 28 has a plurality of guide pins 38, e.g., four. Each pair of guide pins 38 project outward from their corresponding side walls 32. The individual guide pins 38 are fitted in their corresponding first guide slots 20. Thus, the holder 28 is supported by the guide plates 14 so that it can move between a first position where the individual guide pins 38 are located at the upper ends of their corresponding first guide slots 20 and a second position where the guide pins 38 are located at the lower ends of the first guide slots 20. Namely, the holder 28 is supported by the guide plates 14 so as to be able to move vertically in a straight line. The holder 28 also has clamp means 40 which, in conjunction with the spindle 24, holds the floppy disk 26 in the holder 28 in the second position. As seen from FIG. 4, the clamp means 40 includes a support shaft 44 which extends vertically and is supported by a support portion 42 formed on the top wall 30 of the holder 28. The support shaft 44 is supported for vertical movement and rotation. The clamp means 40 further includes a clamper 46 attached to the lower end of the support shaft 44 and facing the spindle 24 inside the holder 28, and a compression spring 48 interposed between the support portion 42 and the clamper 46 in such a way as to urge the clamper 46 toward the spindle 24.

The front plate 18 of the chassis 12 has an inlet opening 50 which corresponds to the floppy disk 26 in shape and size. One end (the right end in FIG. 3) of the holder 28 faces the inlet opening 50 when the holder 28 is in the first position. The right end of the holder 28 defines a gateway 52 through which the floppy disk 26 is inserted into and ejected from the holder 28. The floppy disk 26 is inserted into the holder 28 in the direction of arrow A, through the inlet opening 50 and the gateway 52.

The loading/ejecting device 10 is further provided with a loading/ejecting member 54 which is movably supported by the guide plates 14. The member 54 includes a pair of substantially rectangular loading/ejecting plates 56 spaced apart and facing each other, and a coupling plate 58 coupling the two loading/ejecting plates 56. Each of the plates 56 is located between its corresponding guide plate 14 and the holder 28, and has a pair of support holes 60. One end of each support pin 62 inserted into its corresponding second guide slot 22 from the outside of each guide plate 14 is press-fitted into each corresponding support hole 60. Thus, the loading/ejecting member 54 is supported by the guide plates 14 so that it can move between an initial position where each support pin 62 is located at the left end of its corresponding second guide slot 22 and an advanced position where the support pin 62 is located at the right end of the second guide slot 22. Namely, the loading-/ejecting member 54 is supported for movement parallel to the base plate 16. Each of the loading/ejecting plates 56 has a pair of push holes 64. As shown in FIG. 3, each push hole 64 has a slanted portion 66 extending at an angle of about 45° with respect to the base plate 16, a first retaining portion 68 extending horizontally to the right from the upper end of the slanted portion 66, and a second retaining portion 70 extending horizontally to the left from the lower end of the slanted portion 66. The guide pins 38 of the holder 28 penetrate their corresponding push holes 64, and are fitted into their corresponding first guide slots 20 of the guide plates 14. The loading/ejecting member 54 also has an engaging pin 72 which protrudes inward from one of the loading/ejecting plates 56, e.g., the plate 56 on the left side of FIG. 1. The loading/ejecting member 54 is urged toward the advanced position by tension springs 74 stretched between the individual loading/ejecting plates 56 and guide plates 14.

The loading/ejecting device 10 is further provided with locking means 76 for retaining the loading/ejecting member 54 in its initial position. The locking means 76 includes a support plate 78 fixed on the base plate 16 and aligned with the guide plate 14 on the left side of FIG. 1, and a locking member 80 rockably attached to the support plate 78 by means of a support shaft 79. The locking member 80 has an engaging portion 82 extending toward the guide plate 14 and an inwardly extending push portion 84. The engaging portion 82 has a locking recess 86 capable of engaging the engaging pin 72 of the one loading/ejecting plate 56. The locking member 80 is urged clockwise around the support shaft 79 by a torsion spring 88 wound around the shaft 79. As the locking recess 86 engages with the engaging pin 72, the locking means 76 locks the loading/ejecting member 54 in its initial position against the urging force of the tension springs 74.

Further, the loading/ejecting device 10 has a push member 90 which releases the loading/ejecting member 54 from the locking state via the locking means 76, when the floppy disk 26 is loaded. The push member 90, being elongated, substantially rectangular plate, is movably disposed on the top wall 30 of the holder 28. The push member 90 has a downwardly extending push pin 92, which is inserted into a slot 94 formed in the left end portion of the top wall 30 and extending along the disk loading direction or the longitudinal direction of the side walls 32. The push pin 92 projects into the holder 28 through the slot 94. Thus, the push member 90 is allowed to move along the disk loading direction between a first position where the push pin 92 is located at one end or the gateway-side end of the slot 94 and a second position where the push pin 92 is located at the other end of the slot 94. The push member 90 is urged toward the first position by a tension spring 96 stretched between the push member 90 and the holder 28. When the floppy disk 26 is inserted into the holder 28, the push pin 92 is pushed by the floppy disk 26, so that the push member 90 is moved from the first position to the second position. Thus, the left end of the push member 90 pushes the push portion 84 of the locking member 80 to rock the locking member 80 counterclockwise around the support shaft 79. As a result, the locking recess 86 is disengaged from the engaging pin 72. In FIGS. 1 and 3, numeral 97 designated an operating button for shifting the loading/ejecting member 54 from the advanced position to the initial position. The operating button 97 is slidably supported by the front plate 18. The left end of the operating button 97 can push the coupling plate 58 of the loading/ejecting member 54. The operation button 97 has a stopper 98, which prevents it from coming off of the front plate 18.

The operation of the loading/ejecting device 10 of the aforementioned construction may be described as follows.

Figure 4:
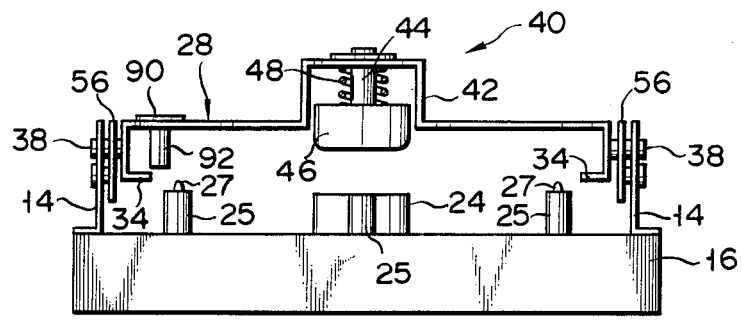

Normally, the holder 28 is located in the first position, and the loading/ejecting member 54 is locked in the initial position by the locking means 76, as shown in FIGS. 3 and 4. In this state, the guide pins 38 of the holder 28 are located at the upper ends of their corresponding first guide slots 20; and, also, in the first retaining portions 68 of their corresponding push holes 64. Accordingly, the individual guide pins 38 are prevented from moving downward, so that the holder 28 is held in the first position as illustrated. When the holder 28 is in the first position, the gateway 52 of the holder 28 faces the inlet opening 50 of the front plate 18. Thus, the floppy disk 26 is allowed to be inserted into the holder 28 through the inlet opening 50 and the gateway 52. The push member 90 is located in the first position, urged by the tension spring 96.

When the floppy disk 26 is inserted in the direction of arrow A (FIG. 2) into the holder 28, through the inlet opening 50 and the gateway 52, the push pin 92 of the push member 90 is pushed by the floppy disk 26, so that the push member 90 is moved from the first position to the second position. Just before the insertion of the floppy disk 26 is completed, that is, just before the push member 90 reaches its second position, the left end of the push member 90 abuts against the push portion 84 of the locking member 80. Thus, before reaching the second portion, the push member 90 rocks the locking member 80 counterclockwise around the support pin 79, against the urging force of the torsion spring 88. As a result, the locking recess 86 is disengaged from the engaging pin 72, so that the loading/ejecting member 54 is moved toward the advance position, i.e., to the right of FIG. 3, being urged by the tension springs 74.

Figure 5:
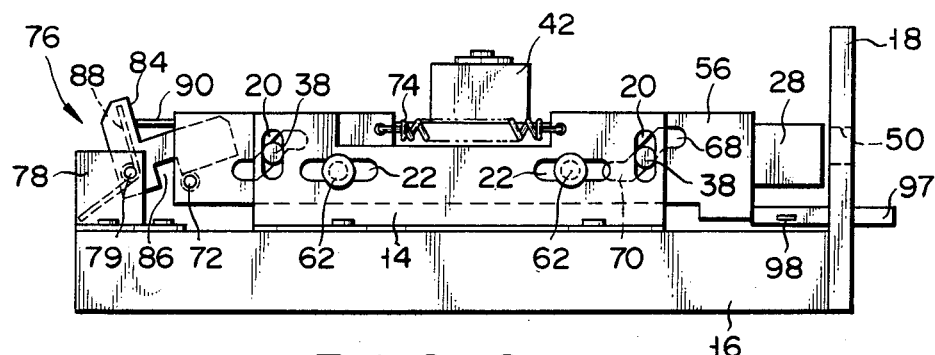
Figure 6:
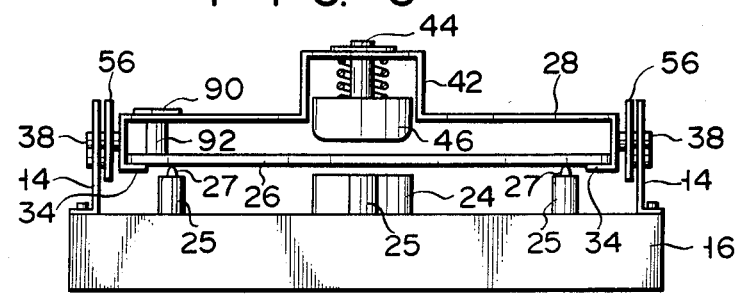

When the loading/ejecting member 54 moves to the right, the guide pins 38 of the holder 28 move downward, being guided by the slanted portions 66 of their corresponding push holes 64 and their corresponding first guide slots 20, as shown in FIGS. 5 and 6. Accompanying this, the holder 28, along with the floppy disk 26, is moved downward. Meanwhile, the floppy disk 26 is located on the flanges 34 of the holder 28. The operating button 97 moves to the right, being pushed by the coupling plate 58.

Figure 7:
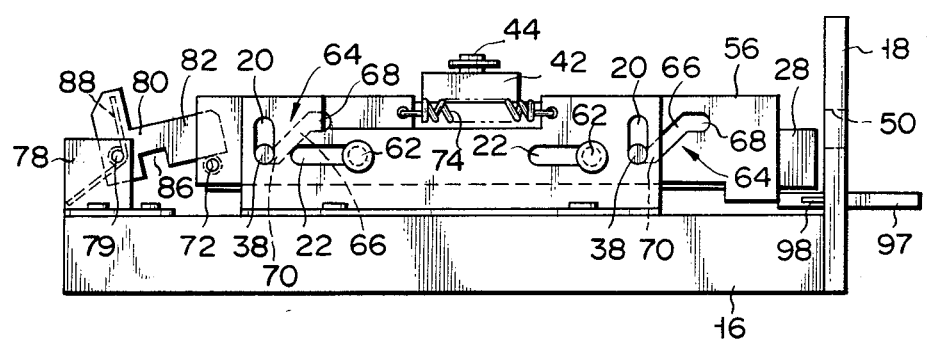
Figure 8:
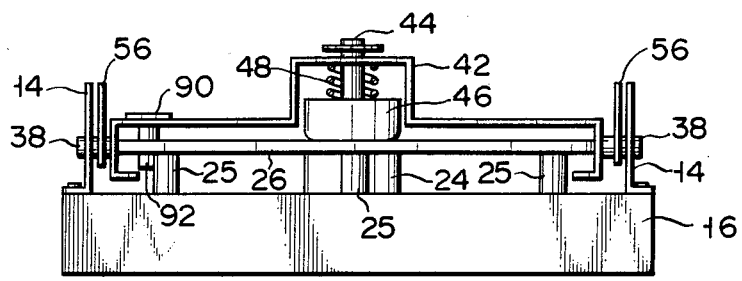

When the loading/ejecting member 54 reaches its advanced position, the guide pins 38 of the holder 28 move to the lower ends of their corresponding first guide slots 20, and are located in the second retaining portions 70 of their corresponding push holes 64, as shown in FIGS. 7 and 8. Thus, the holder 28 is moved to the second position as illustrated and held therein. The lower edge of the engaging portion 82 of the locking member 80 abuts against the engaging pin 72, whereby the locking member 80 is held in the position shown in FIG. 7. In this state, the floppy disk 26 is located on the positioning pins 25, and the engaging projections 27 are inserted into the through holes 29 of the cartridge 36. The floppy disk 26 is located on the spindle 24, and the clamper 46 abuts against the floppy disk 26 so that the floppy disk 26 is pressed against the spindle 24 by the urging force of the compression spring 48. Thus, the magnetic disk 35 (FIG. 2) in the floppy disk 26 is held between the spindle 24 and the clamper 46 for positioning, and is allowed to be rotated by the spindle 24. As the spindle 24 is rotated by the driving source (not shown), the magnetic disk 35 is rotated, for a desired reproducing or recording operation.

The floppy disk 26 is ejected by pushing the operating button 97 to the left. When the operating button 97 is pushed in this manner, the loading/ejecting member 54 is pushed to the left, i.e., toward its initial position, through the medium of the coupling plate 58. When the loading/ejecting member 54 reaches the initial position, the locking recess 86 engages with the engaging pin 72, so that the loading/ejecting member 54 is locked in the initial position. While the loading/ejecting member 54 is moving from the advanced position to the initial position, the guide pins 38 of the holder 28 move upward to the upper ends of their corresponding first guide slots 20 and into the first retaining portions 68 of their corresponding push holes 64, guided by the slant portions 66 of the push holes 64 and the first guide slots 20. Thus, the holder 28, along with the floppy disk 26, rises up to the first position shown in FIG. 3, and is held therein. At the same time, the push member 90 is moved from the second position to the first position by the tension spring 96. As a result, the floppy disk 26 in the holder 28 is pushed to the right by the push pin 92 of the push member 90, thereby being ejected from the holder 28 through the gateway 52 and the inlet opening 50. While the holder 28 is moving from the second position to the first position, the engaging projections 27 of the positioning pins 25 engage with the through holes 29 of the cartridge 36, so that the floppy disk 26 is held in the holder 28. When the holder 28 reaches the first position, the engaging projections 27 are disengaged from the through holes 29, so that the floppy disk 26 can be ejected.

According to the loading/ejecting device 10 constructed in this manner, the holder 28 is moved vertically, in a straight line, in loading or ejecting the floppy disk 26. In the loading/ejecting device 10, therefore, the stroke of the holder is shorter and the necessary space for the movement of the holder is narrower, as compared with the case of the prior art loading/ejecting device, whose holding means is adapted to be rocked. Thus, the magnetic disk drive apparatus can sustain an overall size reduction. Moreover, the holder 28 is moved straight ahead and for a relatively short distance. Therefore, the floppy disk 26 can be positioned with a high degree of accuracy in a predetermined position corresponding to the positions of the driving means of the magnetic disk drive apparatus.

What is claimed is:

1. A loading/ejecting device for loading and ejecting a magnetic disk into and from a magnetic disk drive apparatus which includes a chassis and driving means thereon for rotating the magnetic disk, comprising:
   guide means attached to said chassis, for providing a guide on said chassis;
   a holder located above said driving means and adapted to hold said magnetic disk parallel to said chassis, said holder being supported by said guide means to be linearly movable, in a direction orthogonal to said chassis, between a first position where said magnetic disk can be inserted into or ejected from said holder, and a second position where said magnetic disk can be driven by said driving means;
   a loading/ejecting member supported by said guide means to be movable between an initial position and an advanced position, said loading/ejecting member moving said holder from said first position to said second position as said loading/ejecting member moves from said initial position to said advanced position, and to move said holder from said second position to said first position as said loading/ejecting member moves from said advanced position to said initial position;

locking means for engaging said loading/ejecting member, thereby locking said loading/ejecting member in said initial position;

a push member supported by said holder to be movable between first and second locations, said push member moving from said first location to said second location, in conjunction with insertion of the magnetic disk into said holder, thereby pushing said locking means to be disengaged from said loading/ejecting member; and an operating member capable of pushing said loading/ejecting member toward said initial position.

2. A loading/ejecting device according to claim 1, further including:

urging means for urging said loading/ejecting member toward said advanced position, said loading/ejecting member being moved from said initial position to said advanced position by the urging force of said urging means as said locking means is disengaged from said loading/ejecting member; and push member urging means for urging said push member toward said first location, said push member being adapted to eject the magnetic disk as said push member is moved from said second location to said first location by the urging force of said push member urging means.

3. A loading/ejecting device according to claim 2, wherein said guide means includes a pair of guide plates erected on said chassis and facing each other at a given distance apart, and wherein said holder has a substantially rectangular top wall corresponding in size to the magnetic disk contained in said holder, a pair of side walls located along two facing side edges of said top wall and facing each other, and a gateway for the magnetic disk defined on a third side edge of said top wall, said holder being so disposed between said guide plates that said side walls face said guide plates, individually.

4. A loading/ejecting device according to claim 3, wherein each of said guide plates has a pair of elongated first guide slots spaces apart and extending parallel to each other, and wherein said holder has a plurality of guide pins which project in pairs from each side wall toward the corresponding guide plate, each of said guide pins being slidably fitted into one corresponding first guide slot and adapted to be located at one end of said corresponding first guide slot when said holder is in said first position and to be located at the other end of said corresponding first guide slot when said holder is in said second position.

5. A loading/ejecting device according to claim 4, wherein each of said guide plates has a pair of elongated second guide slots extending at right angles to said first guide slots, and wherein said loading/ejecting member includes a pair of loading/ejecting plates located between their corresponding guide plates and said holder and facing each other, a coupling plate coupling said loading/ejecting plates, and four support pins, each support pin slidably fitted into one of said second guide slots and fixed at one end to said loading/ejecting plates, each of said support pins being located at one end of its corresponding second guide slot when said loading/ejecting member is in said initial position, and located at the other end of said second guide slot when said loading/ejecting member is in said advanced position.

6. A loading/ejecting device according to claim 5, wherein each of said loading/ejecting plates has a pair of push holes, each of said push holes having an elongated slanted portion extending at a given angle with respect to said second guide slots, with each of said guide pins penetrating its corresponding push hole to be fitted into its corresponding first guide slot, so that each guide pin moves from the one end of said first guide slot to the other end, being guided by said first guide slot and the slanted portion of each said push hole, as said loading/ejecting member moves from said initial position to said advanced position, and so that each guide pin moves from said other end of said first guide slot to said one end, being guided by said first guide slot and said slanted portion of each said push hole, as said loading/ejecting member moves from said advanced position to said initial position.

7. A loading/ejecting device according to claim 6, wherein one of said loading/ejecting plates has an engaging pin, and wherein said locking means includes a support plate erected on said chassis to be adjacent and parallel to said loading/ejecting plate, a locking member rockably attached to said support plate and having a push portion and an engaging portion capable of engaging said engaging pin, and an urging member urging said locking member in such a direction that said engaging portion engages said engaging pin, said engaging pin engaging said engaging portion when said loading/ejecting member is located in said initial position.

8. A loading/ejecting device according to claim 7, wherein said push member is disposed on said top wall of said holder to be movable in the magnetic disk loading direction and has a push pin projecting into said holder and capable of engaging with the magnetic disk inserted in said holder, so that said push pin is pushed by the magnetic disk inserted in said holder to move said push member from said first location to said second location, said push member pushing and rocking said push portion of said locking member, thereby disengaging said engaging portion from said engaging pin as said push member moves from said first location to said second location.

9. A loading/ejecting device according to claim 6, wherein each of said push holes has first and second retaining portions extending in opposite directions and at right angles to said first guide slots from both ends of said slanted portion, and wherein each of said guide pins is located in said first retaining portion of its corresponding push hole when said holder is in said first position, and is located in said second retaining portion of said corresponding push hole when said holder is in said second position.

10. A loading/ejecting device according to claim 4, wherein said first guide slots extend at right angles to said chassis, and wherein said holder moves at right angles to said chassis between said first and second positions.

11. A loading/ejecting device according to claim 3, wherein said holder includes clamp means for holding the magnetic disk contained in said holder, in conjunction with the driving means, when said holder is in said second position thereof.

12. A loading/ejecting device according to claim 11, wherein said clamp means includes a support shaft slidably supported by said top wall and projecting into said holder, a clamper fixed to the projected end of said support shaft and facing said driving means, and an urging member interposed between said top wall and said clamper and urging said clamper toward said driving means.

13. A loading/ejecting device for loading and ejecting a magnetic disk into and from a magnetic disk drive apparatus which includes a chassis and driving means thereon for rotating the magnetic disk, comprising:

guide means attached to said chassis, for providing a guide on said chassis;

a holder located above said driving means and adapted to hold said magnetic disk, said holder being supported by said guide means to be linearly movable between a first position where the magnetic disk can be inserted into or ejected from said holder, and a second position where the magnetic disk can be driven by said driving means;

a loading/ejecting member supported by said guide means to be movable between an initial position and an advanced position, said loading/ejecting member moving said holder from said first position to said second position as said loading/ejecting member moves from said initial position to said advanced position, and to move said holder from said second position to said first position as said loading/ejecting member moves from said advanced position to said initial position;

locking means for engaging said loading/ejecting member, thereby locking said loading/ejecting member in said initial position;

a push member supported by said holder to be movable between first and second locations, said push member moving from said first location to said second location, in conjunction with insertion of the magnetic disk into said holder, thereby pushing said locking means to be disengaged from said loading/ejecting member;

urging means for urging said loading/ejecting member toward said advanced position, said loading/ejecting member being moved from said initial position to said advanced position by the urging force of said urging means as said locking means is disengaged from said loading/ejecting member;

push member urging means for urging said push member toward said first location, said push member being adapted to eject the magnetic disk as said push member is moved from said second location to said first location by the urging force of said push member urging means; and an operating member capable of pushing said loading/ejecting member toward said initial position.

* * * * *